Nov. 4, 1941.　　A. J. MATHIEU　　2,261,741
HEADLIGHT TESTING APPARATUS
Filed March 7, 1938　　4 Sheets-Sheet 1

Inventor
André J. Mathieu
Walter N. Haskell
their Attorney
By

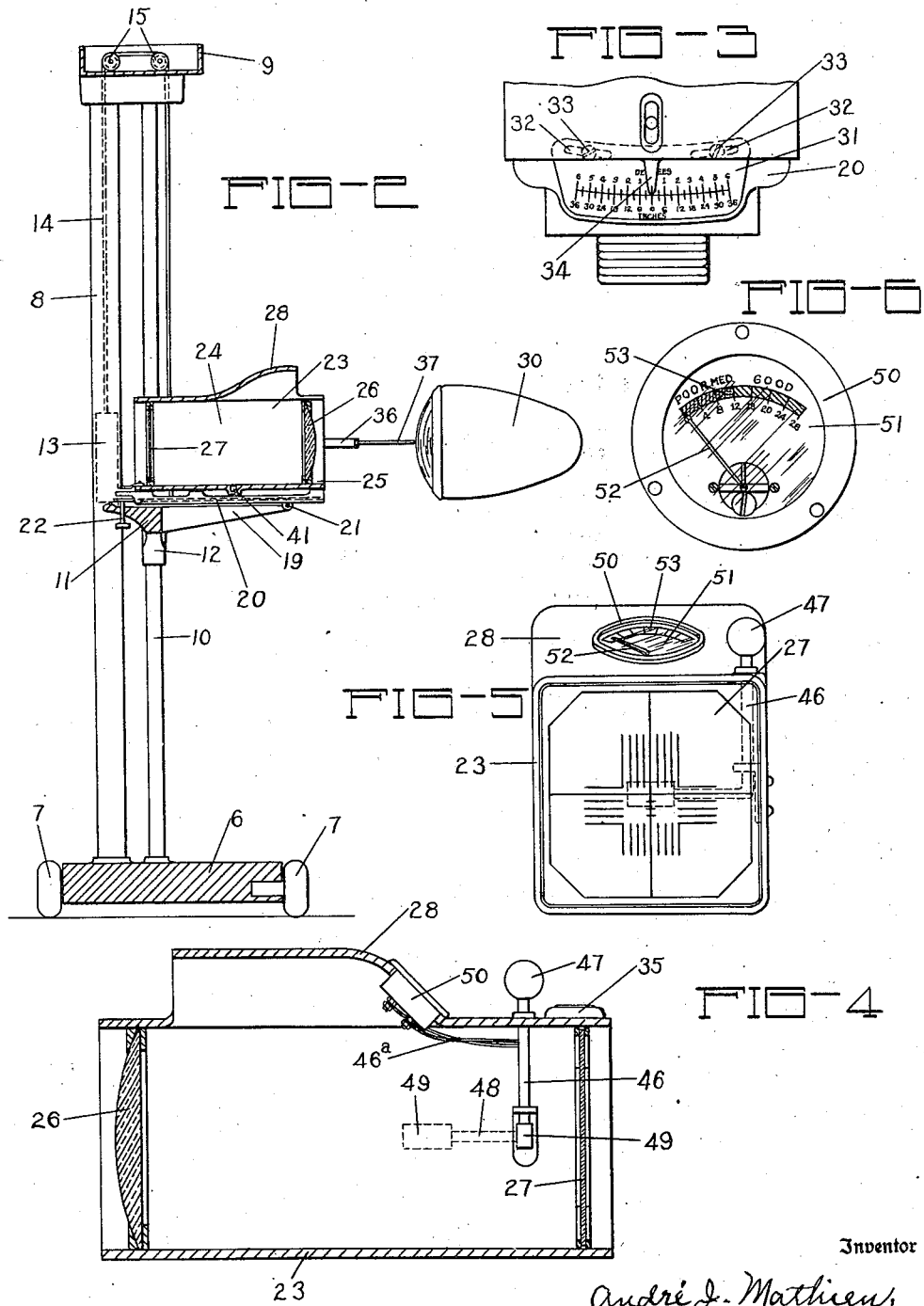

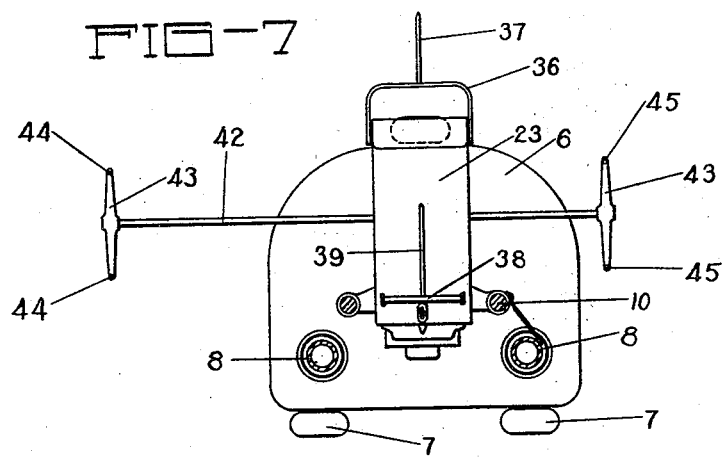
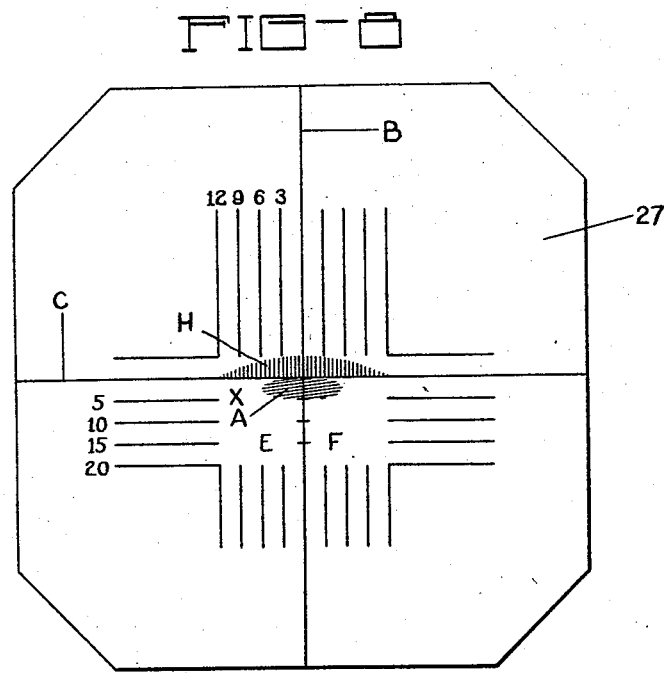

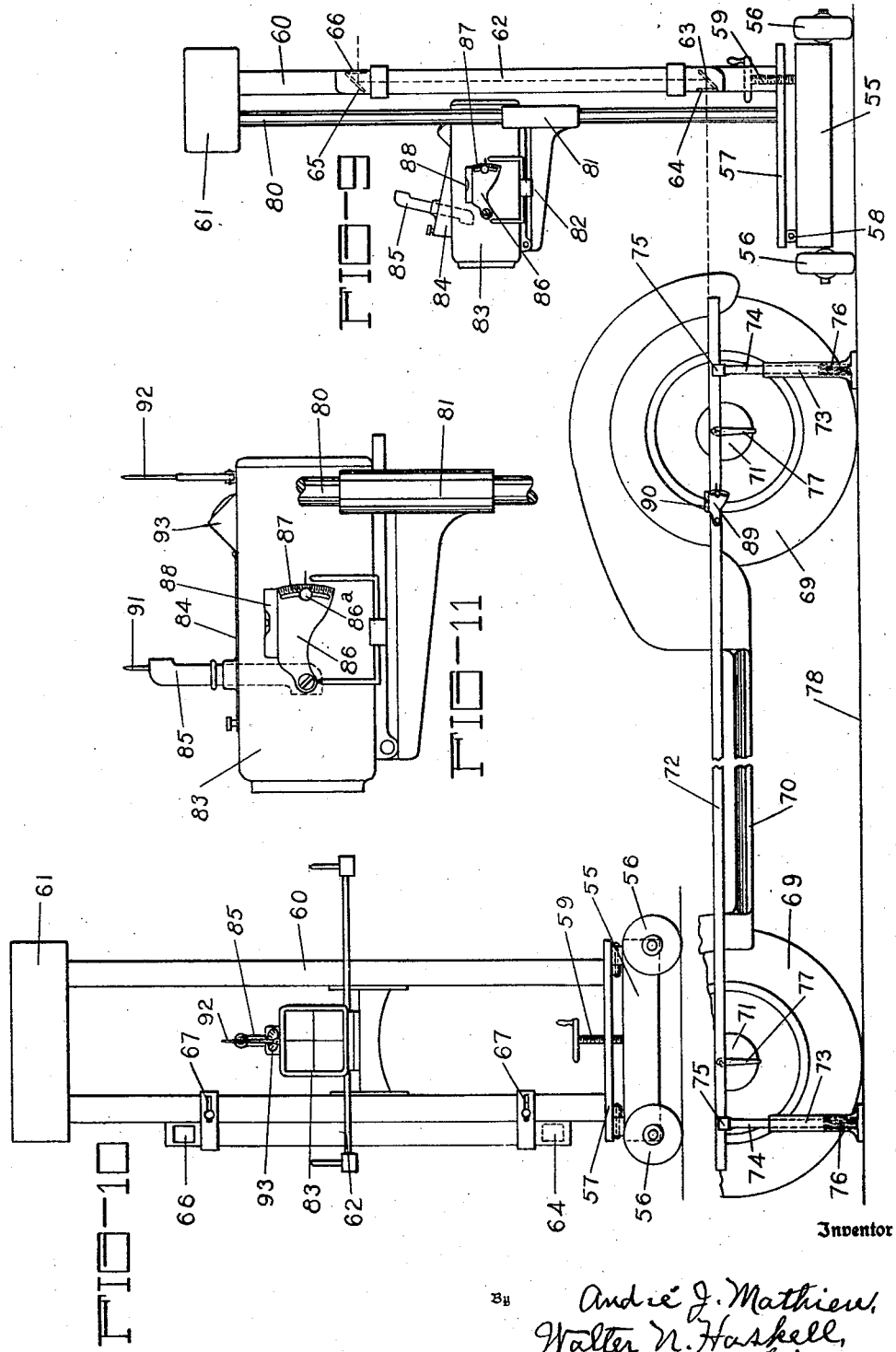

Patented Nov. 4, 1941

2,261,741

UNITED STATES PATENT OFFICE 2,261,741

HEADLIGHT TESTING APPARATUS

André J. Mathieu, Rock Island, Ill., assignor to Bear Manufacturing Company, Rock Island, Ill.

Application March 7, 1938, Serial No. 194,448

11 Claims. (Cl. 88—14)

My invention has reference to a headlight testing apparatus, and has for its chief purpose to determine whether or not the headlights of an automobile conform to the requirements of the law and the demands for safety when driving a vehicle under cover of darkness. It embodies an instrument for receiving the rays of light from the headlight lamp, and converging them upon a screen or other object upon which the light is visually readable.

Another purpose of the invention is to provide a mounting for the instrument by means of which it can be readily transported from one point to another, and turned in one direction or another for positioning in front of a car for testing the headlights thereof. Said mounting includes means for vertical adjustment of the instrument, and for other adjustments tending to bring the same into proper relation with the light, for testing and correcting the same. Included with the means for vertical adjustment is an indicating means whereby the instrument can be positioned to correspond with the varying heights of headlights on different makes of cars.

Another feature of the invention consists of an indicating device whereby the relative positions of the bright light and dimmer light, of a headlight can be gauged and established, so that the rays of light from the dimmer light will have the desired degree of inclination with the ground. This is coupled with a novel arrangement of lines or indicia on the screen upon which the lights are thrown, and which are visible from either side thereof.

In most light testing machines the test is made by an analysis gained by the use of only a portion of the rays of light coming from a lamp, whereas in the present invention all of the rays are concentrated, forming an image on the screen which is a miniature of a light which would appear if the rays were thrown upon a screen or space at a distance of twenty-five feet from the lamp. In case of a fault in the proper positioning of the lamp, it is thereby possible to easily correct the same.

Another purpose of the invention is the provision of sighting devices whereby it can be determined if the center line of the instrument is in alignment with the center line of the headlight.

Another feature set forth in the present application consists of a special means for bringing the testing apparatus into proper position for making a test, regardless of whether the vehicle containing the headlights to be tested is standing on a level floor or on an incline. This consists of a periscope apparatus on the testing machine, to be used in connection with certain sighting elements on the automobile.

Another object of the invention is to provide means for determining the degree of intensity of a headlight lamp, and provide for its replacement in case it is not sufficiently strong.

The above named, and other features and advantages of the invention will more fully appear from the following specification, reference being had to the accompanying drawings, in which:

Fig. 2 is a medial vertical section thereof.

Fig. 3 is a detail of the scale plate 31.

Fig. 4 is a longitudinal section of the testing instrument, with other features added.

Fig. 5 is a rear end view of the casing 23.

Fig. 6 is a detail of the dial 51.

Fig. 7 is a plan view of the invention, with some parts in cross-section.

Fig. 8 is an enlarged detail of the screen 27.

Fig. 9 shows a modified form of the machine and fragmentary part of an automobile, in side elevation.

Fig. 10 is an end view of said machine.

Fig. 11 is an enlarged detail of the testing instrument of said machine.

Figure 1:
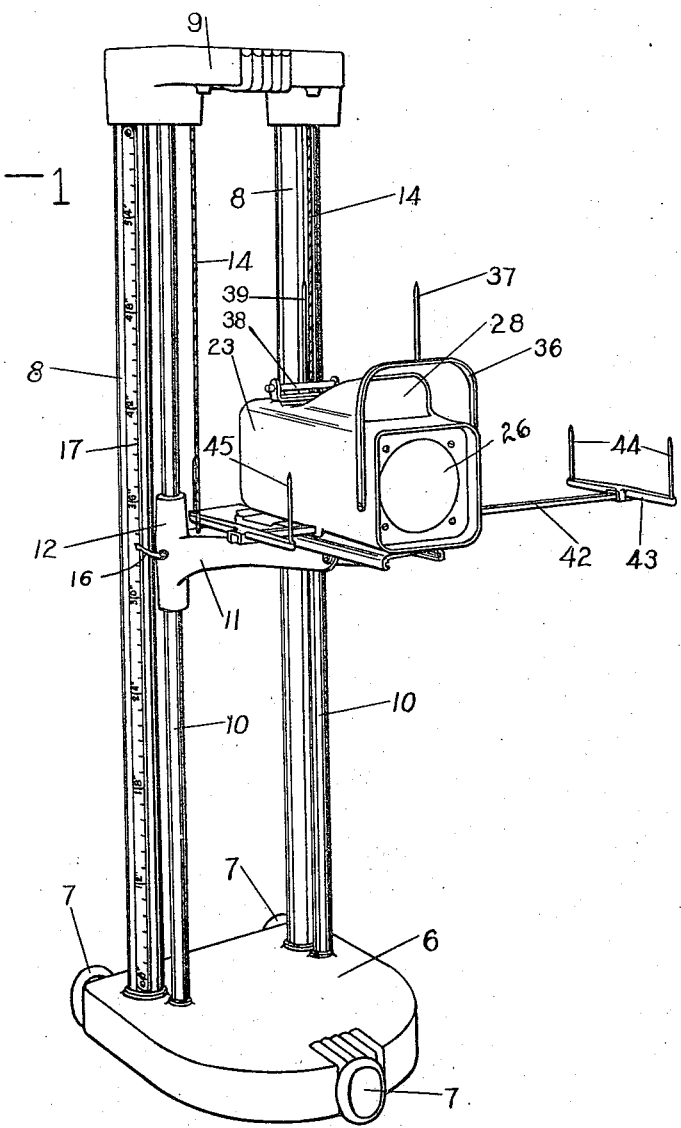
Fig. 1 shows the invention in front perspective.

For convenience in moving the machine about, and for making adjustments to the particular job that is being tested, the device is provided with a special mounting, consisting of a base 6, supported by rollers 7. Mounted on the base is a pair of tubular supports 8, connected at their upper ends by a hollow head 9. A pair of vertical rods 10 is secured in the base 6 at their lower ends and in the head 9 at their upper ends, in parallel relation with the supports 8. Upon the rods 10 a bracket 11 has vertical adjustment, by means of sleeves 12 formed integrally with the bracket and slidable on the rods. The weight of the bracket 11 and parts supported thereby is counterbalanced by weights 13 slidable in the supports 8, and connected with the bracket by cords 14, passing over rollers 15 in the head 9. One of the sleeves 12 has fixed thereto a pointer 16, for use with a scale 17 on the standard 8, to indicate the height of the bracket above the ground.

The bracket 11 has an extension 19, upon which is supported a plate 20, with a pivotal connection at 21. The rear end of the plate 20 rests upon a thumb-screw 22 in the bracket, by the turning of which the end of the plate can be raised or lowered, at will. The plate 20 forms a shelf upon which is supported a casing 23, the interior of which forms a dark-chamber 24, said casing having a pivotal connection with the plate 20 at 25, permitting a swinging movement of the casing horizontally. Fixed in the forward end of the casing 23 is a lens 26, and in its rear end is a ground glass plate or screen 27. The lens is preferably of a plano-convex form as shown. The casing 23 is also provided with a hood or visor 28, through which the screen may be viewed from the front. For best results the lens and screen are positioned about sixteen inches apart.

By stationing the machine in front of an automobile headlight, indicated at 30, the rays of light from the headlight lamp will be brought to a focus by the lens 26, and converged on the screen 27, in the form of a small oval blur thereon, as indicated at A on Fig. 8. In this view, which is from the rear of the screen, and looking toward the headlight, the screen is shown provided with a central vertical line at B, and a similar horizontal line at C, which lines intersect at a central point on the screen, and at or near the spot of light A. Assuming this light to be caused by the bright light of a headlight, it is desirable to have the dimmer light established at a position differing from that of the bright light, to conform with some of the requirements, some of which provide for the rays of the dimmer light converging at a point below the center horizontal line, and at one side of the center vertical line, as for instance at the point X on the screen. This would be to the left of the center.

In some cases it is necessary to make corrections in the positioning of a dimmer light of the cross light or flex beam or multiple beam type, and this is aided by means of a gauge on the rear end of the plate 20, capable of adjustment on an arcuate line by means of arcuate slots 32 in the gauge plate 31, and pins or screws 33 therein. The scale is divided into degrees, and is readable by a pointer 34 fixed to the casing 23. In operation, the bright light is turned on, and shown on the screen at A, at the intersection of the center lines, and the indicator set at the zero mark. The scale plate 31 is then moved to correspond with the number of degrees of desired variation between the bright light and the cross light. The change is then made from the bright light to the cross light, and if not properly positioned, the cross light is corrected to meet the requirements. Any desired change in the position of the screen vertically can be made by the operation of the thumb-screw 22. The box 23 can be brought into a level position by use of a level 35 fixed to the end thereof.

To aid further in determining the true position of a headlight the screen 27 is provided with additional lines, in parallel horizontal relation, as shown at 5, 10, 15, and 20, and additional vertical lines 3, 6, and so on, in parallel relation with the line B. Blank spaces or fields E and F are also left between the lower lines. The amount of displacement of the light on the screen can be easily determined thereby.

In case any part of the spot of light shown at A in Fig. 8 shows above the line C it indicates a faulty position, and one calling for correction. In order that such a fault may be readily detected a danger spot is shown at H on the screen, which may be of red or any other suitable warning color. If any portion of the light A appears in the colored portion it shows that adjustment of the light downwardly is required.

Pivotally connected with the front of the casing 23 is a frame 36, provided with a pin 37, and rockingly mounted on the other end of the casing is a bar 38, carrying a pin 39, in alignment with the pin 37, longitudinally of the casing. By sighting over said pins and along the casing of a headlight it is possible to properly position the instrument with reference thereto. By turning the frame downwardly at the front, as shown in Fig. 2, with the end of the pin 37 against the headlight lens, a proper amount of spacing between the machine and headlight for making a test is established.

On the lower side of the casing 23 is a pair of guides 41, in which is slidable a bar 42, on the ends of which are cross-bars 43, to the ends of which are fixed pins 44 and 45. When the instrument is in front of a headlight, with the pins 37 and 39 in proper alignment, one of the pairs of pins, as 44, is moved to a position in line with the center line of the automobile. By this means it can be determined if the headlight is in proper parallel relation with the center line of the car. When the instrument is in front of the other headlight the bar 42 is moved until the pins 45 are positioned on the center line of the vehicle. In case it appears that the headlights are not in correct alignment, the same can be corrected before the making of the test.

In Fig. 4 of the drawings is shown a rod 46, slidably and rotatably supported in the top of the casing 23, at one side thereof, and provided at its upper end with a knob 47 for operation. Connected with the rod 46 is an arm 48, supporting a light-sensitive cell 49, connected by wires 46ª with an indicator 50, seated in the sloping part of the visor 28. The indicator contains a dial 51, with a hand or pointer 52, for use with a scale shown on the dial at 53. The dial is also provided with words showing that the indication is for "good," "poor," etc. By turning the cell into the path of light, and raising or lowering it if necessary to bring it into the light focus, a test may be made of the intensity of one or other of the lights of the headlight. When not in use the cell can be turned out of the way, so as not to interfere with the other operations. The force of the rays of light is imparted to the dial 51, moving the indicator thereon, and showing whether replacements or corrections are needed in the headlight. By the means just described tests of the lamps can be made in daylight, and the dial is at a convenient point for being read from the rear of the machine.

Figures 9, 10, and 11 show a modified construction, in which the numeral 55 indicates a small truck, mounted on wheels 56, and upon which is supported a plate 57, with a pivotal connection at 58. At the other end of the plate is a handscrew 59, operable in said plate, and in contact below with the truck 55. By turning the handscrew in one direction or the other the end of plate 57 is raised or lowered, bringing it into an inclined position, sloping to the right or left in Fig. 9, as the case may be. Supported on the plate 57 is a pair of uprights 60, united at their upper ends by a cap 61. At the side of one of said uprights is a sighting device 62, of periscope formation, provided at its lower end with a mirror 63 and opening 64 in front thereof, and at its upper end with a mirror 65, and opening 66 in rear thereof. The mirrors are so arranged that an object reflected on the lower one thereof will be communicated to the upper mirror, and visible to the eye through the opening 66.

The apparatus just described is for use with a sighting instrument on an automobile, a fragmentary part of which vehicle is shown in Fig. 9, consisting of wheels 69, running board 70, and hub caps 71. A bar 72 is supported by the side of the wheels 69, by means of tubular stands 73, and posts 74 held telescopically therein. The upper ends of said posts are fitted with saddles 75, in which the bar 72 is held. Beneath the posts are coiled springs 76, tending to hold such posts yieldably at their highest points. Near the ends of the bar 72 are hook pins 77, for catching under the lower edges of the hub caps, as shown in the drawings. Said pins are pivoted to the bar, and by forcing one end of the bar downwardly the pin at that end can be swung beneath the hub cap to engage therewith. The other end of the bar 72 is then similarly operated, and engaged with the other hub cap. In this position the bar 72 is parallel with the floor upon which the car stands, and can be used as a sighting instrument, in the manner hereinafter set forth. By positioning the instrument 62 so that by looking into the same at the upper end it is possible to sight along the upper side of bar 72, the center line of said instrument will be at a right angle with the line of the bar, and a light testing instrument carried in conjunction with said sighting apparatus should be in proper position for making a test. That is, the center line of a casing, such as shown at 83, should be parallel with the line of the bar 72 and with the ground.

Under normal conditions, with a vehicle sitting on a level floor, the instrument 62 would be at right angles with the bar, as shown in Fig. 9, with the plate 57 in a level position. If the floor upon which the car rests is sloping, however, in one direction or the other, or there are other irregularities therein, the right angle position can only be secured by tilting the instrument 62 to conform thereto. In case of a garage or shop which does not have a large enough level space for a car to stand on, this will permit of a test being made without having to provide a concrete floor or other level space for the purpose, which is not always feasible. On account of the portable character of the truck, the same can be run in front of a vehicle standing on the street, with such vehicle sloping toward the curb, or otherwise.

The instrument 62 is also capable of adjustment vertically, by means of straps 67 which hold the same connected with the support 60, and which are slidable thereon. The instrument is thereby capable of adjustment to conform to any variations in the height of the bar 72. The sighting apparatus is shown for illustration only, it being understood that other objects or points adjacent to the vehicle can be established to take the place of the bar 72.

A pair of rods 80 is also mounted vertically between the plate 57 and cap 61, upon which rods are slidable sleeves 81, supporting a bracket 82, carrying a casing 83, similar to the casing 23, and to be operated in the same way. Assuming the casing 83 to be positioned at the same height as the headlight of the vehicle, the center line of the casing should be in line with the center line of the headlight, or practically so, on account of being parallel with the plate 57 and the sighting line.

The casing 83 is provided with a movable hood 84, in which a small periscope 85 is slidably mounted. When positioned as shown in Fig. 11, the periscope can be used for determining if the lamp in the headlight is properly positioned, and if not, corrections can be made by adjustment of the headlight. Slight variations can be taken care of by vertical or lateral adjustments of the casing 83, in the manner hereinbefore set forth for the casing 23.

The proper positioning of the apparatus with reference to the vehicle can be further substantiated by means of a plate 86 pivoted to the side of the casing 83, and provided with a scale 87 at its broader end, with a mark on the box for use therewith. Supported by the plate is a level 88, and in case of unevenness of the floor the scale can be set to show the amount thereof, in degrees. A similar device 89 is pivoted to the bar 72, and provided with a level 90 and a scale similar to the first named scale. If the instrument 89 shows a variation in the floor level the plate 86 is moved to show the same variation, and the box made to conform thereto, by adjustment of the plate 57. This should also bring the instrument 62 into position at right angles with the line of the bar 72.

In Fig. 11 the periscope 85 is shown provided at its upper end with a pin 91 for sighting along the top of the casing in connection with a telescopic rod 92, pivoted to the rear end of the casing so as to fold downwardly out of the way of the dial supported at 93. When the periscope 85 is not in use it is moved upwardly out of the way of the light as shown in Fig. 9.

What I claim and desire to secure, is:

1. In a headlight testing apparatus, an upwardly extending support, a casing adjustably mounted on said support, a light ray converging lens at one end of the casing, a translucent screen at the other end of the casing, a window in the first named end of the casing, for viewing the screen, said lens being substantially coextensive with the lens of the headlight being tested, means for determining the proper relative position of the casing lens with respect to the headlight lens, said screen having a horizontal line and a vertical line intersecting each other, and other horizontal and vertical lines terminating at one side of the first named vertical line and below the first named horizontal line to provide a clear field for receiving the images of the direct light and the cross light of the headlight and indicating their relative positions.

2. A device as claimed in claim 1 wherein said screen is provided with a colored warning area immediately above the first named horizontal line to indicate an unsatisfactory condition of the headlight being tested.

3. In an automobile headlight testing apparatus, a support, a test head adjustably supported upon said support, means for determining the necessary adjustment of the test head to position it with its axis in a line parallel to the plane of the automobile supporting surface, said means including means for fixing a line alongside the automobile parallel to the said surface and a periscope cooperating with said test head positioned laterally of said test head, said periscope having a lower and an upper reflecting surface, means for adjusting said periscope to bring its lower reflecting surface in position to receive the image of the end of said fixed line and transmit said image to the upper reflecting surface for viewing the same, and means for adjusting the test head to correspond with the adjustment of the periscope.

4. An automobile headlight testing apparatus as claimed in claim 3 wherein the periscope is mounted on said support and movable with the test head.

5. A headlight testing apparatus as claimed in claim 3 wherein the test head is pivoted to the support and the periscope is secured thereto and movable therewith.

6. A headlight testing apparatus as claimed in claim 3 wherein the apparatus is provided with means for adjusting the test head to align it with the headlight being tested.

7. In an automobile headlight testing apparatus, a test head, means cooperating with said test head for determining the proper relative position of said head with respect to the headlight being tested, said means comprising a device for viewing a line fixed alongside of the automobile being tested, and means for fixing the line, said last named means comprising a bar, yieldably mounted supports for the ends of the bar, and hooks on said bar for engaging under the hub caps of the automobile.

8. In an automobile headlight testing apparatus, a test head, a lens in one end thereof for focussing the light from the headlight, a screen in the opposite end thereof for receiving the image focussed by the lens, sighting devices for determining the proper position of the test head with relation to the headlight being tested, a periscope for viewing the headlight to determine the position of the lamp therein, said periscope having a reflecting surface at its lower end, said periscope being adjustably mounted on the test head for movement into and out of operative viewing position wherein the reflecting surface is located between the screen and the lens for receiving the focussed image, said periscope having a mirror at the upper end thereof for viewing the image on the reflecting surface.

9. An automobile headlight testing apparatus as claimed in claim 8 wherein the test head comprises a casing provided with a window, a movable hood for closing the window, the periscope being supported by the hood and movable therewith, said hood when opened carrying the periscope away from its operative viewing position and permitting the viewing of said screen and the image thereon through the window.

10. In an automobile headlight testing apparatus, a support, a test head thereon, a screen at one end of the head, a lens at the opposite end of the test head for focussing the direct and cross beams of the headlight being tested, a light sensitive device movably mounted in said test head and between the lens and the screen, means on said head and connected with the light sensitive device for indicating the intensity of the beams, means for rotating said light sensitive device out of the path of the beams from the headlight passing from the lens to the screen, and means for sliding said device in position to receive the beams of either the direct or the cross lights.

11. An automobile headlight testing apparatus comprising a support, a test head carried thereby, a pair of sighting elements mounted on said support and spaced longitudinally thereof for alignment with the headlight to be tested, auxiliary sighting elements comprising a pair of sights on each side of said test head and laterally thereof, said auxiliary sighting elements being slidably mounted for movement transversely of the support whereby one pair of said sights may be brought into alignment with the axis of the automobile, all of said pairs of sighting elements being parallel to the central plane of the automobile.

ANDRÉ J. MATHIEU.